(12) United States Patent
Sullivan et al.

(10) Patent No.: US 9,840,273 B2
(45) Date of Patent: Dec. 12, 2017

(54) ELECTROHYDRAULIC STEERING SYSTEM WITH DIAGNOSTICS

(71) Applicant: Caterpillar Inc., Peoria, IL (US)

(72) Inventors: Patrick Sullivan, Orland Park, IL (US); Nathanael McRostie, Oswego, IL (US); Edward Mate, Manhattan, IL (US); Beau Kuipers, Morris, IL (US)

(73) Assignee: Caterpillar Inc., Peoria, IL (US)

( * ) Notice: Subject to any disclaimer, the term of this patent is extended or adjusted under 35 U.S.C. 154(b) by 2 days.

(21) Appl. No.: 14/960,668

(22) Filed: Dec. 7, 2015

(65) Prior Publication Data

US 2017/0158229 A1  Jun. 8, 2017

(51) Int. Cl.
| | |
|---|---|
| *B62D 5/06* | (2006.01) |
| *B62D 5/09* | (2006.01) |
| *B62D 5/04* | (2006.01) |
| *B62D 6/00* | (2006.01) |
| *B62D 5/30* | (2006.01) |

(52) U.S. Cl.
CPC .......... *B62D 5/062* (2013.01); *B62D 5/0457* (2013.01); *B62D 5/09* (2013.01); *B62D 5/30* (2013.01); *B62D 6/00* (2013.01)

(58) Field of Classification Search
CPC ........ B62D 5/062; B62D 5/0457; B62D 5/09; B62D 5/30; B62D 6/00; F16K 11/044; F15B 13/02
See application file for complete search history.

(56) References Cited

U.S. PATENT DOCUMENTS

| | | |
|---|---|---|
| 3,407,894 A | 10/1968 | Thompson et al. |
| 3,747,725 A | 7/1973 | Feustel et al. |
| 3,882,678 A | 5/1975 | Fassbender |
| 3,902,401 A | 9/1975 | Allen et al. |
| 4,237,993 A | 12/1980 | Jablonsky |
| 4,326,558 A | 4/1982 | Gage |
| 5,489,005 A | 2/1996 | Marcott et al. |
| 5,682,744 A | 11/1997 | Hasegawa et al. |
| 6,173,728 B1 | 1/2001 | Venable et al. |
| 6,408,977 B1 * | 6/2002 | Obertrifter ............... B62D 1/22 180/417 |
| 7,610,989 B2 * | 11/2009 | Vigholm ................. B62D 1/22 180/418 |
| 2014/0298798 A1 | 10/2014 | Belshan et al. |

* cited by examiner

*Primary Examiner* — Joseph Rocca
*Assistant Examiner* — Marlon A Arce
(74) *Attorney, Agent, or Firm* — Miller, Matthias & Hull LLP

(57) ABSTRACT

A steering system for a machine is disclosed. The steering system may include a first pilot system including a first pilot source and a first set of electrohydraulic valves, and a second pilot system including a second pilot source and a second set of electrohydraulic valves. The first pilot system and the second pilot system may be configured to move the steering valve via pilot flow of the hydraulic fluid. The steering system may further include an electrohydraulic selector valve configured to regulate pilot flow to the first set of electrohydraulic valves and the second set of electrohydraulic valves. The electrohydraulic selector valve may be a two-position, five-way valve.

20 Claims, 6 Drawing Sheets

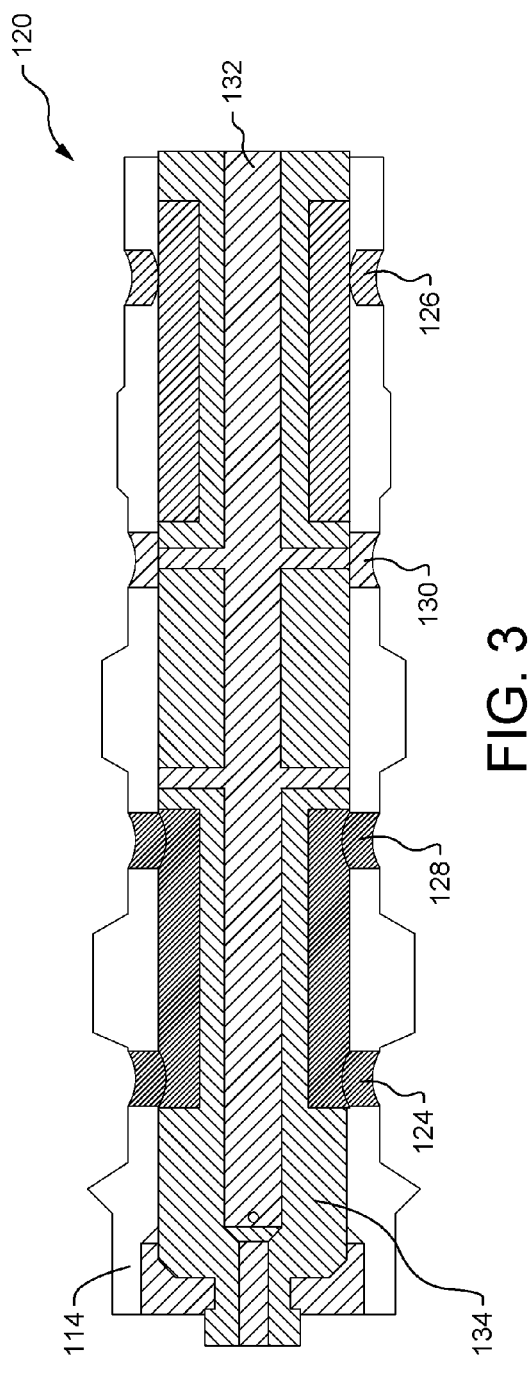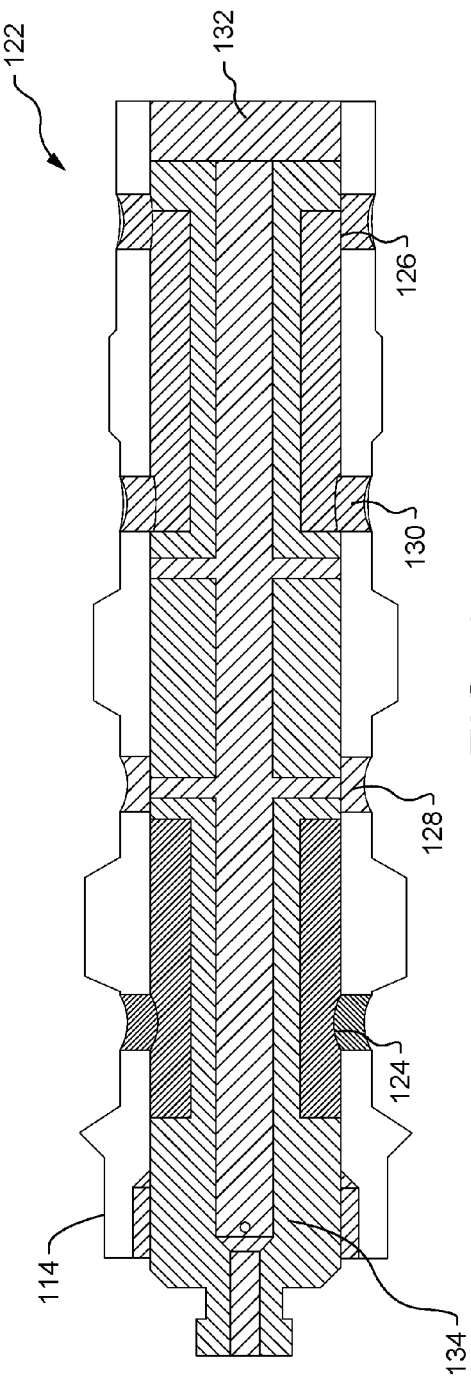

ELECTROHYDRAULIC STEERING SYSTEM WITH DIAGNOSTICS

FIELD OF THE DISCLOSURE

The present disclosure relates generally to machines and, more particularly, to electrohydraulic steering systems and methods for machines.

BACKGROUND OF THE DISCLOSURE

Machines utilize electrohydraulic steering systems because of their versatility over purely mechanical and hydraulic steering systems. In electrohydraulic steering systems, hydraulic power provides the muscle for the actual steering function via hydraulic components, while electrical components provide the command for the precision control of the hydraulic components. A redundant or secondary steering system may be implemented in concert with a primary steering system in order to take over control of the hydraulic components of the machine when necessary.

In one example, the redundant or secondary steering system may always be activated. Accordingly, there exists a need for a redundantly controlled electrohydraulic steering system that can turn the redundant or secondary steering system off.

A switching valve is disclosed in U.S. Pat. No. 6,173,728, entitled, "Switching Valve for a Hydraulic Power Steering System." The switching valve of the '728 patent operates to direct hydraulic fluid to the steering control valve from either the primary pump or the auxiliary pump. More specifically, the '728 switching valve includes a spring that biases a spool of the switching valve to a neutral position. The spool of the switching valve is movable from the neutral position against the bias of the spring under the influence of a hydraulic fluid pressure differential.

However, the '728 patent does not utilize a redundant or secondary steering system. As such, the '728 switching valve only directs flow from the primary pump and the auxiliary pump straight to the steering control valve.

SUMMARY OF THE DISCLOSURE

In accordance with one embodiment, a steering system for a machine is disclosed. The steering system may include a set of hydraulic cylinders configured to actuate steering of the machine, and a steering valve configured to regulate main flow of a hydraulic fluid to the set of hydraulic cylinders. The steering system may further include a first pilot system configured to move the steering valve via pilot flow of the hydraulic fluid. The first pilot system may include a first pilot source and a first set of electrohydraulic valves. The steering system may further include a second pilot system configured to move the steering valve via pilot flow of the hydraulic fluid. The second pilot system may include a second pilot source and a second set of electrohydraulic valves. The steering system may further include an electrohydraulic selector valve configured to regulate pilot flow to the first set of electrohydraulic valves and the second set of electrohydraulic valves.

The electrohydraulic selector valve may include a first inlet port fluidly connected to the first pilot source, a second inlet port fluidly connected to the second pilot source, a first outlet port fluidly connected to the first set of electrohydraulic valves, a second outlet port fluidly connected to the second set of electrohydraulic valves, and a drain port fluidly connected to a drain. The electrohydraulic selector valve may further include a first end position wherein the first inlet port is in communication with the first outlet port and the second outlet port is in communication with the drain port. The electrohydraulic selector valve may further include a second end position wherein the second inlet port is in communication with the second outlet port and the first outlet port is in communication with the drain port.

In accordance with another embodiment, a method for checking a secondary steering system of a machine is disclosed. The method may include supplying a first pilot flow of a hydraulic fluid to a first set of electrohydraulic valves from a first pilot source; supplying a second pilot flow of the hydraulic fluid to a second set of electrohydraulic valves from a second pilot source; generating a main flow, the first pilot flow, and the second pilot flow of the hydraulic fluid with at least one pump; regulating the first pilot flow and the second pilot flow to a steering valve with the first set of electrohydraulic valves and the second set of electrohydraulic valves; and detecting a displacement of the steering valve with a sensor.

The method may further include placing an electrohydraulic selector valve in fluid communication with the first pilot source, the second pilot source, the first set of electrohydraulic valves, the second set of electrohydraulic valves, and a drain, the electrohydraulic selector valve including a first end position and a second end position; monitoring the first set of electrohydraulic valves, the second set of electrohydraulic valves, the sensor, and the electrohydraulic selector valve with a controller; and commanding the electrohydraulic selector valve to the second end position wherein the second pilot source is fluidly connected to the second set of electrohydraulic valves and the first set of electrohydraulic valves is fluidly connected to the drain.

The method may further include directing the second set of electrohydraulic valves to move the steering valve a predetermined distance preprogrammed into a memory associated with the controller; receiving signals indicative of a displacement of the steering valve; and determining a condition of the second pilot system based on the displacement of the steering valve, the commanding, directing, receiving and determining being performed by the controller.

In accordance with another embodiment, a machine is disclosed. The machine may include a set of ground engaging members, a steering input device configured to receive input from an operator for a desired steering of the ground engaging members, and a steering system configured to actuate the set of ground engaging members based on the input received from the operator via the steering input device. The steering system may include a set of hydraulic cylinders configured to steer the set of ground engaging members, a steering valve configured to regulate main flow of a hydraulic fluid to the set of hydraulic cylinders, a first pilot system including a first pilot source and a first set of electrohydraulic valves configured to move the steering valve via pilot flow of the hydraulic fluid, a second pilot system including a second pilot source and a second set of electrohydraulic valves configured to move the steering valve via pilot flow of the hydraulic fluid, at least one pump configured to generate main flow and pilot flow of the hydraulic fluid, and a sensor configured to detect a displacement of the steering valve.

The machine may further include an electrohydraulic selector valve in fluid communication with the first pilot source, the second pilot source, the first set of electrohydraulic valves, the second set of electrohydraulic valves, and a drain and configured to regulate pilot flow to the first set of electrohydraulic valves and the second set of electrohydraulic valves. The electrohydraulic selector valve may include a first end position wherein the first pilot source is fluidly connected to the first set of electrohydraulic valves and the second set of electrohydraulic valves is fluidly connected to the drain. The electrohydraulic selector valve may further include a second end position wherein the second pilot source is fluidly connected to the second set of electrohydraulic valves and the first set of electrohydraulic valves is fluidly connected to the drain.

The machine may further include a controller in communication with the first set of electrohydraulic valves, the second set of electrohydraulic valves, the sensor, and the electrohydraulic selector valve. The controller may be configured to check the second pilot system by commanding the electrohydraulic selector valve to move to the second end position, commanding the second set of electrohydraulic valves to move the steering valve a predetermined distance preprogrammed into a memory associated with the controller, and monitoring signals from the sensor indicative of the displacement of the steering valve.

These and other aspects and features will become more readily apparent upon reading the following detailed description when taken in conjunction with the accompanying drawings. In addition, although various features are disclosed in relation to specific exemplary embodiments, it is understood that the various features may be combined with each other, or used alone, with any of the various exemplary embodiments without departing from the scope of the disclosure.

BRIEF DESCRIPTION OF THE DRAWINGS

FIG. 3 is a cross-sectional view of part of an electrohydraulic pilot selector valve of the steering system of FIG. 2 in a first end position or de-energized state;

FIG. 4 is a cross-sectional view of the electrohydraulic pilot selector valve of FIG. 3 in a second end position or fully energized state;

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

Figure 1:
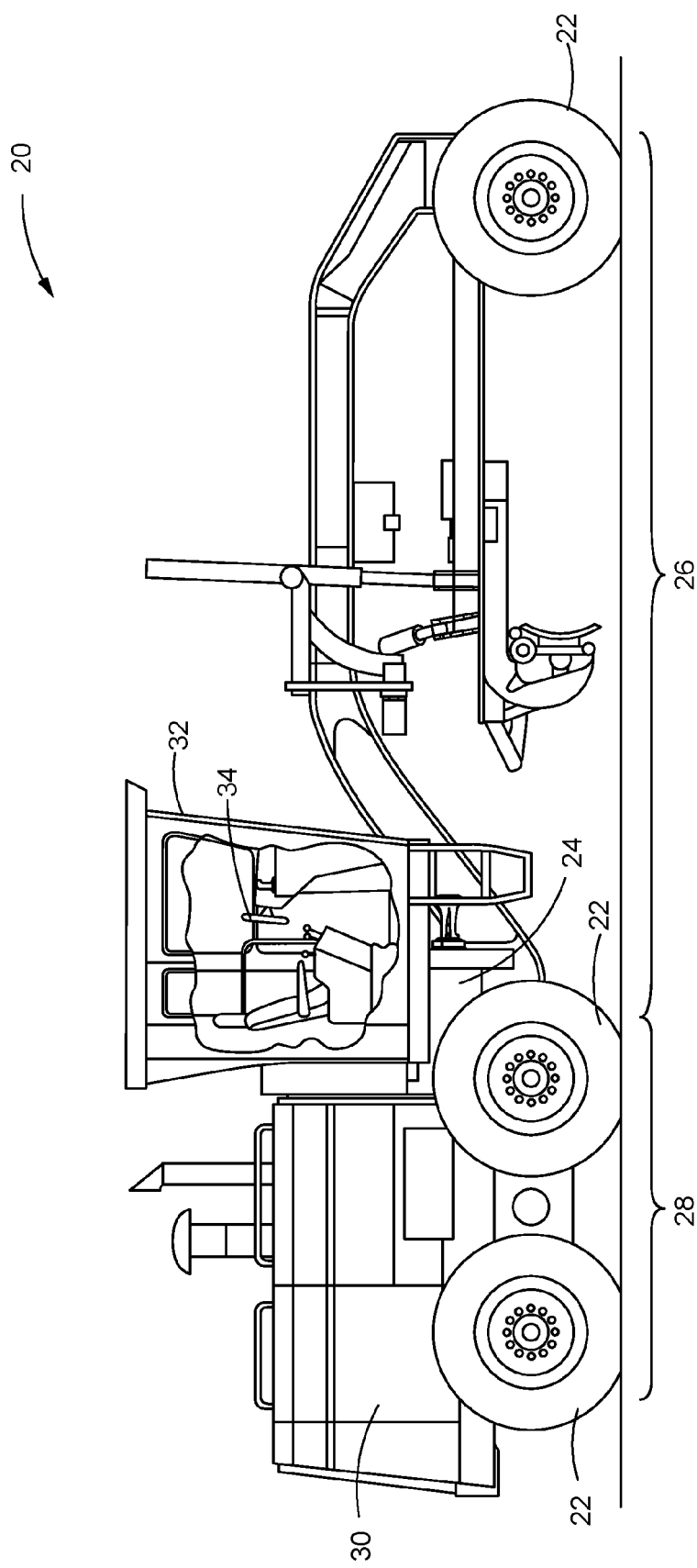
FIG. 1 is a side, partially cut-away view of a machine, in accordance with one embodiment of the present disclosure.

Referring now to the drawings, and with specific reference to FIG. 1, a machine 20 is shown, in accordance with certain embodiments of the present disclosure. It is to be understood that although the machine 20 is illustrated as a motor grader, the machine may be of any other type. As used herein, the term "machine" refers to a mobile machine that performs a driven operation involving physical movement associated with a particular industry, such as, earthmoving, construction, landscaping, forestry, transportation, agriculture, mining, etc.

Non-limiting examples of machines include commercial and industrial machines, such as motor graders, articulated wheel loaders, loaders, excavators, earth-moving vehicles, dozers, tractors, backhoes, trucks, mining vehicles, on-highway vehicles, trains, agricultural equipment, material handling equipment, and other types of machines that operate in a work environment. It is to be understood that the machine 20 is shown primarily for illustrative purposes to assist in disclosing features of various embodiments, and that FIG. 1 does not depict all of the components of a machine.

The machine 20 may include a set of ground engaging members 22 that support a frame 24, such as a front frame 26 and a rear frame 28. Although the set of ground engaging members 22 are shown as wheels, the members 22 may be tracks or of any other type. An engine 30 or other power source may be operatively configured to drive the ground engaging members 22. Supported by the rear frame 28, an operator cab 32 may house one or more steering input devices 34 configured to receive input from an operator of the machine 20 for a desired steering of the ground engaging members 22 and/or the front frame 26 and the rear frame 28. The steering input device 34 may comprise a steering wheel, a joystick, or any other type of operator control.

Figure 2:
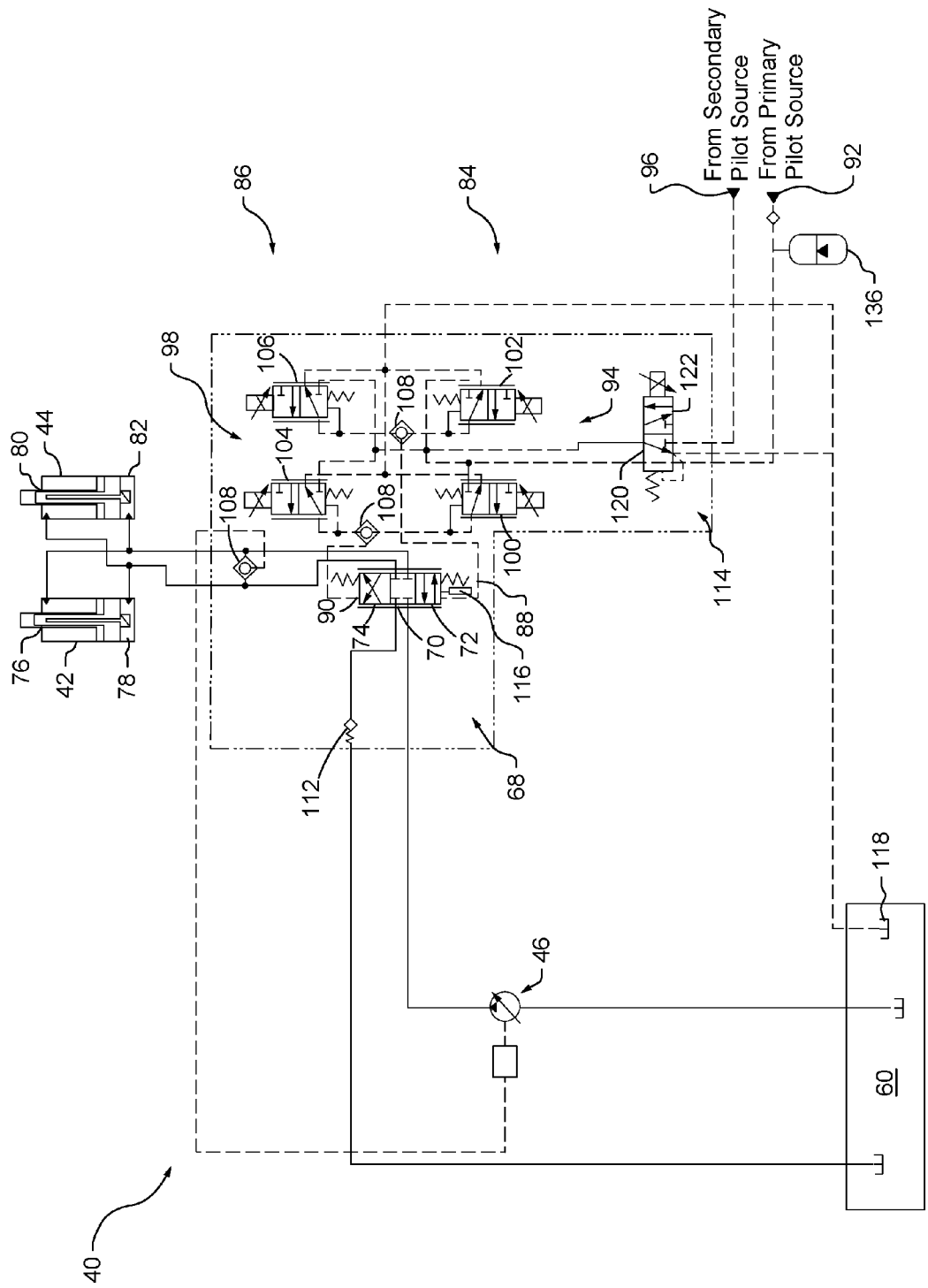
FIG. 2 is a schematic diagram of a redundantly controlled electrohydraulic steering system for the machine of FIG. 1, in accordance with another embodiment.

Referring now to FIG. 2, with continued reference to FIG. 1, the machine 20 may further include an electrohydraulic steering system 40. The steering system 40 may be configured to actuate the ground engaging members 22 and/or articulation of the front and rear frames 26, 28 based on the input received from the operator via the steering input device 34. More specifically, the steering system 40 may include hydraulic actuators, such as a set of hydraulic cylinders 42, 44 or other type of actuator that is configured to steer the ground engaging members 22 and/or the front and rear frames 26, 28 of the machine 20.

In one example, such as for Ackermann steering, the hydraulic cylinders 42, 44 may be operatively connected to the front frame 26 of the machine 20 and a linkage (not shown) that is coupled to the ground engaging members 22 on the front frame 26. In this example, the hydraulic cylinders 42, 44 may be used to turn the front ground engaging members 22 and steer the machine 20. In another example, such as for articulation of the machine 20, the hydraulic cylinders 42, 44 may be operatively connected between the front frame 26 and the rear frame 28 in order to pivot the front frame 26 relative to the rear frame 28 at a desired articulation angle and to steer the machine 20.

The hydraulic cylinders 42, 44 may receive power from a main flow of hydraulic fluid provided by a primary pump 46. Driven by the engine 30, the primary pump 46 may draw hydraulic fluid from a reservoir or hydraulic tank 60 to generate main flow to the hydraulic cylinders 42, 44. However other configurations for the primary pump 46 may be used.

A steering valve 68 may be configured to regulate main flow of the hydraulic fluid from the primary pump 46 to the hydraulic cylinders 42, 44. For example, the steering valve 68 may be a proportional directional control valve, such as a spool valve or other type of valve. The steering valve 68 may have a first position 70, a second position 72, and a third position 74. The steering valve 68 may be biased to the first position 70, which is a neutral or closed position. In the first position 70 of the steering valve 68, there is no flow to the hydraulic cylinders 42, 44.

The second position 72 of the steering valve 68 may direct the main flow from the primary pump 46 to a first end 76 of hydraulic cylinder 42 and a second end 82 of hydraulic cylinder 44. The third position 74 of the steering valve 68 may direct a main flow from the primary pump 46 to a first end 80 of hydraulic cylinder 44 and a second end 78 of hydraulic cylinder 42. In so doing, the main flow of the hydraulic fluid causes movement of the set of hydraulic cylinders 42, 44, thereby actuating steering of the machine 20. However, other configurations for the first position 70, the second position 72, and the third position 74 of the steering valve 68 may be used.

To move the steering valve 68 to the second position 72 and the third position 74, a pilot flow of the hydraulic fluid from a first pilot system 84 and a redundant or second pilot system 86 may be used. More specifically, pilot flow may be supplied at a first end 88 and a second end 90 of the steering valve 68. Depending on whether pilot flow is delivered to the first end 88 or the second end 90, the steering valve 68 may be shifted to the second position 72 or the third position 74, respectively.

In addition, the steering valve 68 may include a sensor 116 configured to detect a displacement or position of the steering valve 68. For example, the sensor 116 may comprise a spool feedback sensor that detects a distance the steering valve 68 has shifted. However, other configurations for the sensor 116 may be used.

Fluidly connected to the steering valve 68, the first pilot system 84 and the second pilot system 86 may each be configured to move the steering valve 68 via pilot flow of the hydraulic fluid. The second pilot system 86 may be implemented in concert with the first pilot system 84 in order to take over control of the steering system 40 when necessary. In so doing, the first pilot system 84 or the second pilot system 86 may actuate the hydraulic cylinders 42, 44 and redundantly control steering of the machine 20.

More specifically, the first pilot system 84 may comprise a first pilot source 92 and a first set of electrohydraulic valves 94. The second pilot system 86 may comprise a second pilot source 96 and a second set of electrohydraulic valves 98. Each of the first pilot source 92 and the second pilot source 96 may supply pilot flow of the hydraulic fluid from at least one of the primary pump 46, a dedicated pilot supply pump, and any other pump on the machine 20.

For example, the dedicated pilot supply pump may generate pilot flow for both the first pilot source 92 and the second pilot source 96 via pressure reducing valves, while the primary pump 46 may generate backup pilot flow to the second pilot source 96. In addition, a hydraulic accumulator 136 may be in fluid communication with the first pilot source 92 and/or the second pilot source 96. However, other configurations for the first pilot source 92 and the second pilot source 96 may be used. For instance, depending on the type of the machine 20, such as a motor grader or an articulated wheel loader, configurations for the first pilot source 92 and the second pilot source 96 may vary.

The first pilot source 92 may supply pilot flow to the first set of electrohydraulic valves 94, and the second pilot source 96 may supply pilot flow to the second set of electrohydraulic valves 98. The first set of electrohydraulic valves 94 and the second set of electrohydraulic valves 98 may each be configured to regulate flow to the steering valve 68. More specifically, each of the first set of electrohydraulic valves 94 and the second set of electrohydraulic valves 98 may comprise a left control valve 100, 104 and a right control valve 102, 106, respectively.

For example, each of the left control valves 100, 104 and the right control valves 102, 106 may comprise a solenoid valve, although other types of electrohydraulic valves may be used. The left control valves 100, 104 may be fluidly connected to the first end 88 of the steering valve 68, and the right control valves 102, 106 may be fluidly connected to the second end 90 of the steering valve 68 in order to move the steering valve 68 to the second position 72 or the third position 74, respectively. Moreover, other configurations for the first pilot system 84 and the second pilot system 86 may be used as well.

In addition, the steering system 40 may include other components, such as resolver valves 108 and a spring loaded check valve 112. For instance, resolver valves 108 may be positioned in fluid communication between the left control valves 100, 104 and between the right control valves 102, 106, although a resolver valve may also be positioned in other places within the steering system 40. Furthermore, components of the steering system 40 may be arranged in a different configuration and include or exclude various components based on the type of the machine 20.

An electrohydraulic pilot selector valve 114 may be configured to regulate pilot flow of the hydraulic fluid to the first pilot system 84 and the second pilot system 86. More specifically, the selector valve 114 may be configured to regulate pilot flow from the first pilot source 92 and the second pilot source 96 to the first set of electrohydraulic valves 94 and the second set of electrohydraulic valves 98, respectively. Furthermore, the selector valve 114 may be configured to turn off each of the first pilot system 84 and the second pilot system 86.

The selector valve 114 may comprise a two-position, five-way valve. For example, the selector valve 114 may be a cartridge style valve directly actuated by a push type or a pull type solenoid. In fluid communication with the first pilot source 92, the second pilot source 96, the first set of electrohydraulic valves 94, the second set of electrohydraulic valves 98, and a drain 118, the selector valve 114 may have a first end position 120 and a second end position 122. The drain 118 may be fluidly connected to the hydraulic tank 60.

In the first end position 120, the first pilot source 92 may be fluidly connected to the first set of electrohydraulic valves 94, and the second set of electrohydraulic valves 98 may be fluidly connected to the drain 118. The second pilot source 96 may be blocked in the first end position 120. In the second end position 122, the second pilot source 96 may be fluidly connected to the second set of electrohydraulic valves 98, and the first set of electrohydraulic valves 94 may be fluidly connected to the drain 118. The first pilot source 92 may be blocked in the second end position 122.

Figure 5:
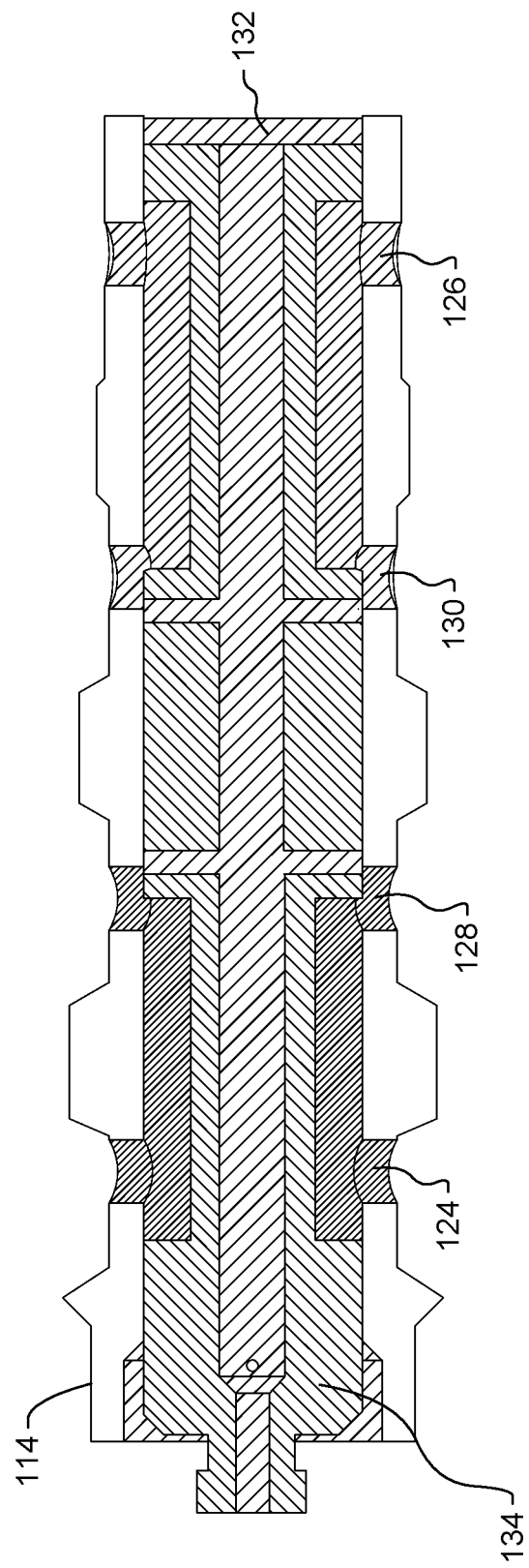
FIG. 5 is a cross-sectional view of the electrohydraulic pilot selector valve of FIG. 3 in transition between the first end position and the second end position.

The selector valve 114 may include a first inlet port 124, a second inlet port 126, a first outlet port 128, a second outlet port 130, and a drain port 132, as shown in FIGS. 3-5. The first inlet port 124 may be fluidly connected to the first pilot source 92, and the second inlet port 126 may be fluidly connected to the second pilot source 96. The first outlet port 128 may be fluidly connected to the first set of electrohydraulic valves 94, and the second outlet port 130 may be fluidly connected to the second set of electrohydraulic valves 98. In addition, the drain port 132 may be fluidly connected to the drain 118.

Furthermore, the selector valve 114 may be biased, such as spring biased, to the first end position 120. Thus, the first end position 120 may be the de-energized state or default state of the selector valve 114. As shown in FIG. 3, in the first end position 120, the first inlet port 124 is fluidly connected to the first outlet port 128, the second outlet port 130 is connected to the drain port 132, and the second inlet port 126 is blocked.

When the solenoid of the selector valve 114 is fully energized, the applied force of the solenoid will overcome the preload of the spring to shift a spool 134 of the selector valve 114 to a full travel position, which is the second end position 122. Thus, the fully energized state of the selector valve 114 may be the second end position 122. As shown in FIG. 4, in the second end position 122, the second inlet port 126 is fluidly connected to the second outlet port 130, the first outlet port 128 is fluidly connected to the drain port 132, and the first inlet port 124 is blocked.

In so doing, the selector valve 114 has the ability to turn off each of the first pilot system 84 and the second pilot system 86. More specifically, when the selector valve 114 is in the first end position 120 or de-energized state, the first pilot system 84 is turned on and the second pilot system 86 is turned off. When the selector valve 114 is in the second end position 122 or fully energized state, the second pilot system 86 is turned on and the first pilot system 84 is turned off. However, in other embodiments, the first end position 120 may be the fully energized state and the second end position 122 may be the de-energized state.

Moreover, during transition between the first end position 120 and the second end position 122, such as from the first end position 120 to the second end position 122 and vice versa, the first inlet port 124 may be fluidly connected to the first outlet port 128, and the second inlet port 126 may be fluidly connected to the second outlet port 130, as shown in FIG. 5. Therefore, when the spool 134 of the selector valve 114 is shifting from one end position to the other, both pilot sources 92, 96 are supplied to the first and second set of electrohydraulic valves 94, 98. In so doing, steering may always be actuated.

Figure 6:
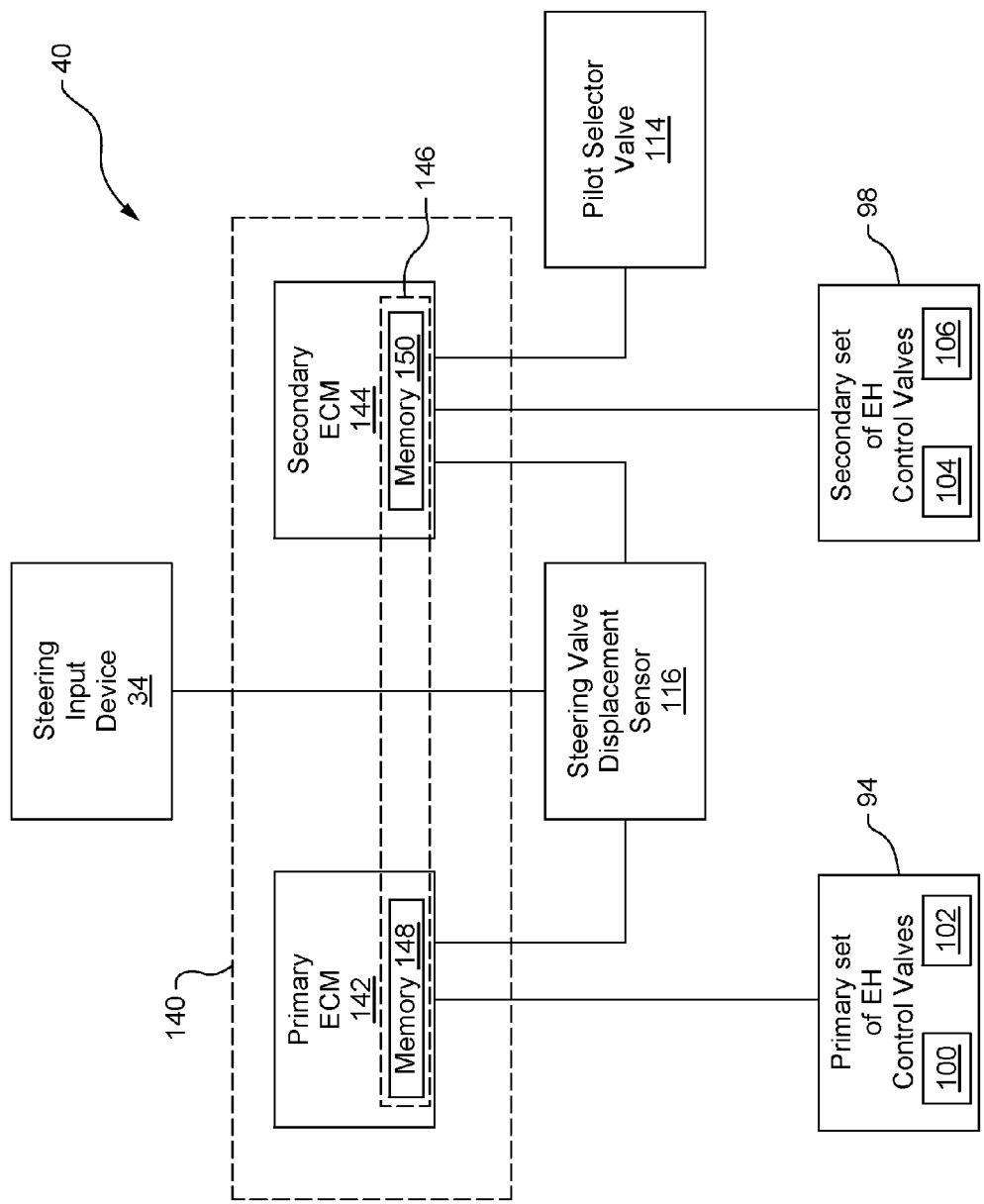
FIG. 6 is a block diagram of the steering system of FIG. 2 including a controller operatively connected to various components.

Referring now to FIG. 6, with continued reference to FIGS. 1-5, operation of the redundantly controlled steering system 40, the selector valve 114, the first set of electrohydraulic valves 94, and the second set of electrohydraulic valves 98 may be monitored and controlled by one or more control units of the machine 20, such as by a controller 140. The controller 140 may be implemented using one or more of a processor, a microprocessor, a microcontroller, a digital signal processor (DSP), a field-programmable gate array (FGPA), an electronic control module (ECM), an electronic control unit (ECU), and a processor-based device that may include or be associated with a non-transitory computer readable storage medium having stored thereon computer-executable instructions, or any other suitable means for electronically controlling functionality of the steering system 40.

For example, the controller 140 may comprise a first ECM 142 and a second ECM 144 in operative electronic communication with the steering input device 34, the selector valve 114, the first set of electrohydraulic valves 94, the second set of electrohydraulic valves 98, and the sensor 116 of the steering valve 68, although other configurations for the controller 140 than that shown in FIG. 6 may be used. Each of the first ECM 142 and the second ECM 144 may be configured to operate according to predetermined algorithms or sets of instructions for operating the steering system 40. Such algorithms or sets of instructions may be programmed or incorporated into a memory 146 associated with or at least accessible to the controller 140.

For example, the memory 146 of the controller 140 may include a first memory 148 associated with the first ECM 142 and a second memory 150 associated with the second ECM 144, although other configurations may be used. Comprising a non-volatile memory, each of the first memory 148 and the second memory 150 may be provided within and/or external to the first ECM 142 and the second ECM 144, respectively. It is understood that the controller 140 may include other hardware, software, firmware, and combinations thereof.

For example, the controller 140 may receive signals from the steering input device 34 indicative of the desired steering of the machine 20. Based on those signals, the controller 140 may send signals to the first set of electrohydraulic valves 94 or the second set of electrohydraulic valves 98 in order to control pilot flow to the steering valve 68 and actuate hydraulic cylinders 42, 44. Furthermore, the controller 140 may be configured to monitor a condition of the steering system 40 based on signals received from the sensor 116 of the steering valve 68.

INDUSTRIAL APPLICABILITY

In general, the foregoing disclosure finds utility in various industrial applications, such as in earthmoving, construction, industrial, agricultural, mining, transportation, and forestry machines. In particular, the disclosed control system may be applied to motor graders, articulated wheel loaders, loaders, excavators, earth-moving vehicles, dozers, tractors, backhoes, trucks, mining vehicles, on-highway vehicles, trains, agricultural equipment, material handling equipment, and the like.

By applying the disclosed redundantly controlled electrohydraulic steering system to a machine, both the primary pilot system and the redundant or secondary pilot system can be turned off in order to meet International Organization for Standardization (ISO) standards. In particular, the disclosed steering system incorporates a two-position, five-way pilot selector valve. In so doing, the secondary pilot system may be turned off while the primary pilot system is turned on. Furthermore, while the secondary pilot system is turned on, the primary pilot system may be turned off. In addition, when transitioning between each position, both pilot systems may be connected to their pilot sources so that steering may be actuated in the event the pilot selector valve gets stuck in transition between states.

Figure 7:
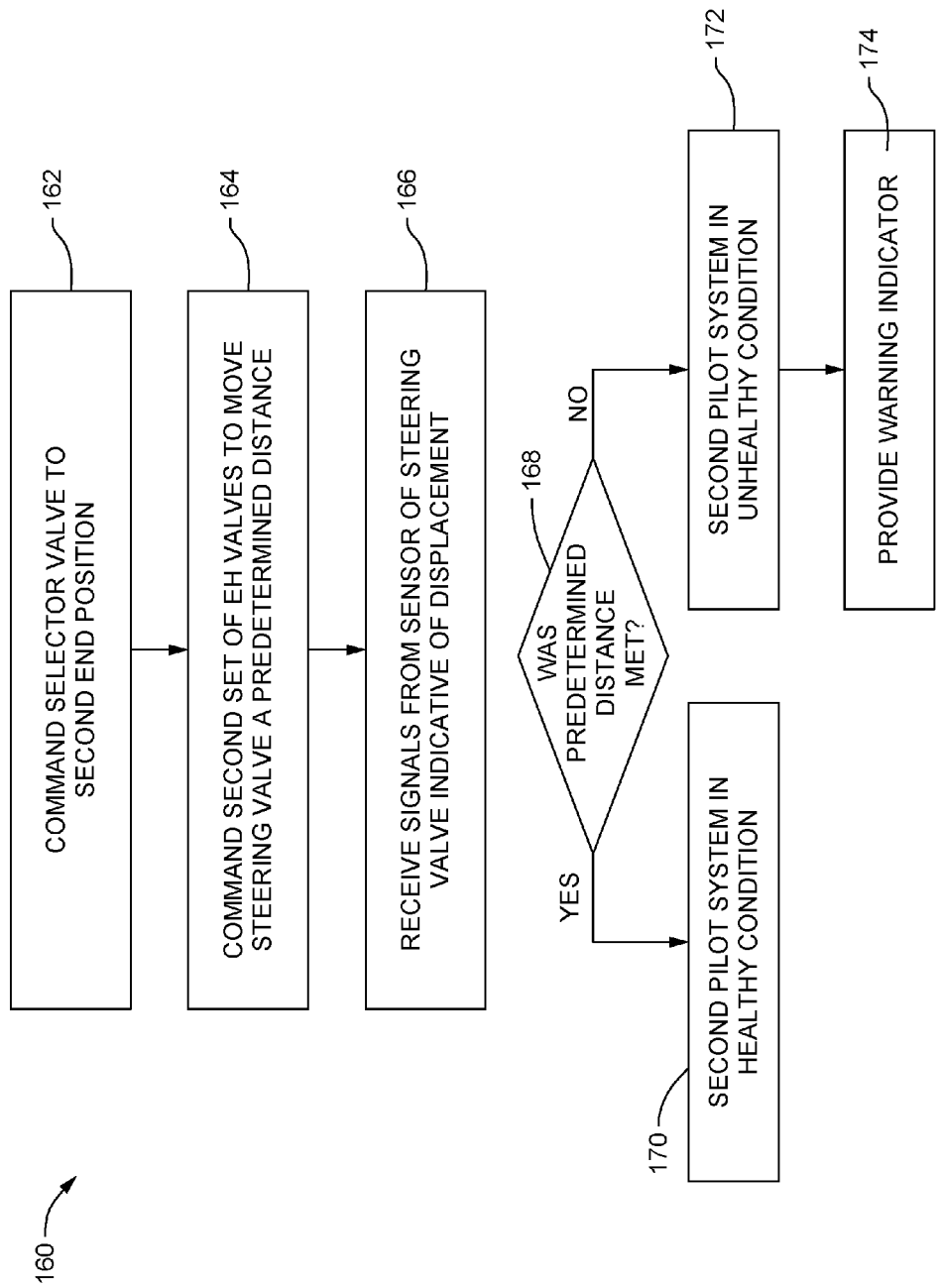
FIG. 7 is a flowchart illustrating an example process for checking a secondary system, such as a second pilot system, of a machine, in accordance with another embodiment.

Referring now to FIG. 7, with continued reference to FIGS. 1-6, a flowchart illustrating an example algorithm or process 160 for checking a secondary steering system, such as the second pilot system 86, of the machine 20 is shown, in accordance with another embodiment. More specifically, the controller 140 may be configured to check a health or condition of the second pilot system 86 by periodically performing a diagnostic. The algorithm or process 160 may be programmed into the memory 146 of the controller 140.

At block 162, the controller 140 may command the selector valve 114 to move to the second end position 122 such that the second pilot system 86 is turned on and the first pilot system 84 is turned off. For example, the second ECM 144 may generate a command and send a corresponding signal or current to the solenoid of the selector valve 114 in order to shift the spool 134 of the selector valve 114 into the second end position 122 or the fully energized state. In the second end position 122, the second pilot source 96 is connected to the second set of electrohydraulic valves 98, the first set of electrohydraulic valves 94 is connected to the drain 118, and the first pilot source 92 is blocked.

At block 164, the controller 140 may command the second set of electrohydraulic valves 98 to move the steering valve 68 a predetermined distance. For example, the second ECM 144 may generate commands for the left control valve 104 and the right control valve 106, and send a corresponding signal or current to solenoids of each of the left control valve 104 and the right control valve 106 in order to open or close the control valves 104, 106 and maintain an output pressure of pilot flow. By opening or closing each of the left control valve 104 and the right control valve 106, pilot flow of the hydraulic fluid is provided to move the steering valve 68. The generated commands may be known to shift the steering valve 68 by the predetermined distance. The predetermined distance may be preprogrammed into the memory 146 associated with the controller 140.

After commanding the second set of electrohydraulic valves 98 to move the steering valve 68 the predetermined distance, the controller 140 may receive signals from the sensor 116 of the steering valve 68 indicative of an actual displacement of the steering valve 68, at block 166. Based on the signals indicative of the actual displacement of the steering valve 68, the controller 140 may determine the health or condition of the second pilot system 86. For instance, at block 168, the controller 140 may check if the predetermined distance was met based on the signals from the sensor 116 of the steering valve 68.

More specifically, the controller 140 may compare the actual displacement of the steering valve 68 to the predetermined distance. For example, the controller 140 may compare the actual displacement of the steering valve to a predetermined range of acceptable values proximate the predetermined distance. The predetermined range of acceptable values proximate the predetermined distance may be preprogrammed into the memory 146 associated with the controller 140.

At block 168, if the actual displacement of the steering valve is within the predetermined range of acceptable values proximate the predetermined distance, the controller 140 may determine a healthy condition of the second pilot system 86 at block 170. At block 168, if the actual displacement of the steering valve is outside the predetermined range of acceptable values proximate the predetermined distance, the controller 140 may determine an unhealthy condition of the second pilot system at block 172.

If the second pilot system 86 is in an unhealthy condition, the controller 140 may be configured to provide a warning indicator to the operator of the machine 20 at block 174. For example, the controller 140 may be in communication with an operator interface within the operator cab 32 of the machine 20. Upon determining the unhealthy condition, the controller 140 may be configured to send signals to the operator interface to notify the operator of the unhealthy condition of the second pilot system 86, such as via a visual or audio message.

In another example, the controller 140 may be configured to notify the operator of the healthy condition as well. In addition, the process 160 may be used to check a health or condition of the selector valve 114. Furthermore, although shown and described in connection with the second pilot system 86 and the second set of electrohydraulic valves 98, a similar algorithm or process as process 160 may be used to check the primary steering system, such as the first pilot system 84, of the machine 20. For example, the controller 140 may command the selector valve 114 to move to the first end position 120, command the first set of electrohydraulic valves 94 to move the steering valve 68 a predetermined distance, check the actual displacement of the steering valve 68 from signals received by the sensor 116, and notify the operator of the condition of the first pilot system 84.

It is to be understood that the flowchart in FIG. 7 is shown and described as an example only to assist in disclosing the features of the disclosed system, and that more or less steps than that shown may be included in the processes corresponding to the various features described above for the disclosed system without departing from the scope of the disclosure.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A steering system for a machine, comprising:
   a set of hydraulic cylinders configured to actuate steering of the machine;
   a steering valve configured to regulate main flow of a hydraulic fluid to the set of hydraulic cylinders;
   a first pilot system configured to move the steering valve via pilot flow of the hydraulic fluid, the first pilot system including a first pilot source and a first set of electrohydraulic valves;
   a second pilot system configured to move the steering valve via pilot flow of the hydraulic fluid, the second pilot system including a second pilot source and a second set of electrohydraulic valves; and
   an electrohydraulic selector valve configured to regulate pilot flow to the first set of electrohydraulic valves and the second set of electrohydraulic valves, the electrohydraulic selector valve including:
      a first inlet port fluidly connected to the first pilot source;
      a second inlet port fluidly connected to the second pilot source;
      a first outlet port fluidly connected to the first set of electrohydraulic valves;
      a second outlet port fluidly connected to the second set of electrohydraulic valves;
      a drain port fluidly connected to a drain;
      a first end position wherein the first inlet port is in communication with the first outlet port and the second outlet port is in communication with the drain port; and
      a second end position wherein the second inlet port is in communication with the second outlet port and the first outlet port is in communication with the drain port.

2. The steering system of claim 1, wherein the first outlet port is in communication with the first inlet port and the second outlet port is in communication with the second inlet port in transition between the first end position and the second end position.

3. The steering system of claim 2, wherein the second inlet port is blocked in the first end position, and the first inlet port is blocked in the second end position.

4. The steering system of claim 3, wherein each of the first set of electrohydraulic valves and the second set of electrohydraulic valves includes a left control valve and a right control valve.

5. The steering system of claim 1, further comprising a pump configured to provide main flow and pilot flow of the hydraulic fluid.

6. The steering system of claim 1, wherein the steering valve includes a sensor configured to detect a displacement of the steering valve.

7. The steering system of claim 6, further comprising a controller in communication with the sensor, the controller configured to receive signals from the sensor indicative of the displacement of the steering valve.

8. The steering system of claim 7, wherein the controller is further configured to determine a condition of the second pilot system based on the displacement of the steering valve.

9. The steering system of claim 8, wherein the controller is further configured to notify an operator of the machine of the condition of the second pilot system.

10. A method for checking a secondary steering system of a machine, comprising:
supplying a first pilot flow of a hydraulic fluid to a first set of electrohydraulic valves from a first pilot source;
supplying a second pilot flow of the hydraulic fluid to a second set of electrohydraulic valves from a second pilot source;
generating a main flow, the first pilot flow, and the second pilot flow of the hydraulic fluid with at least one pump;
regulating the first pilot flow and the second pilot flow to a steering valve with the first set of electrohydraulic valves and the second set of electrohydraulic valves;
detecting a displacement of the steering valve with a sensor;
placing an electrohydraulic selector valve in fluid communication with the first pilot source, the second pilot source, the first set of electrohydraulic valves, the second set of electrohydraulic valves, and a drain, the electrohydraulic selector valve including a first end position and a second end position;
monitoring the first set of electrohydraulic valves, the second set of electrohydraulic valves, the sensor, and the electrohydraulic selector valve with a controller;
commanding the electrohydraulic selector valve to the second end position wherein the second pilot source is fluidly connected to the second set of electrohydraulic valves and the first set of electrohydraulic valves is fluidly connected to the drain;
directing the second set of electrohydraulic valves to move the steering valve a predetermined distance preprogrammed into a memory associated with the controller;
receiving signals indicative of a displacement of the steering valve; and
determining a condition of a second pilot system based on the displacement of the steering valve, the commanding, directing, receiving and determining being performed by the controller.

11. The method of claim 10, further comprising comparing the displacement of the steering valve to the predetermined distance in order to determine the condition of the second pilot system.

12. The method of claim 11, further comprising determining a healthy condition of the second pilot system if the displacement of the steering valve is within a predetermined range of acceptable values proximate the predetermined distance, the predetermined range of acceptable values being preprogrammed into the memory associated with the controller.

13. The method of claim 12, further comprising determining an unhealthy condition of the second pilot system if the displacement of the steering valve is outside the predetermined range of acceptable values.

14. The method of claim 13, further comprising notifying an operator of the machine of the unhealthy condition of the second pilot system.

15. The method of claim 14, further comprising commanding the electrohydraulic selector valve to the first end position wherein the first pilot source is fluidly connected to the first set of electrohydraulic valves and the second set of electrohydraulic valves is fluidly connected to the drain.

16. A machine comprising:
a set of ground engaging members;
a steering input device configured to receive input from an operator for a desired steering of the ground engaging members;
a steering system configured to actuate the set of ground engaging members based on the input received from the operator via the steering input device, the steering system including:
a set of hydraulic cylinders configured to steer the set of ground engaging members;
a steering valve configured to regulate main flow of a hydraulic fluid to the set of hydraulic cylinders;
a first pilot system including a first pilot source and a first set of electrohydraulic valves configured to move the steering valve via pilot flow of the hydraulic fluid;
a second pilot system including a second pilot source and a second set of electrohydraulic valves configured to move the steering valve via pilot flow of the hydraulic fluid;
at least one pump configured to generate main flow and pilot flow of the hydraulic fluid;
a sensor configured to detect a displacement of the steering valve;
an electrohydraulic selector valve in fluid communication with the first pilot source, the second pilot source, the first set of electrohydraulic valves, the second set of electrohydraulic valves, and a drain and configured to regulate pilot flow to the first set of electrohydraulic valves and the second set of electrohydraulic valves, the electrohydraulic selector valve including a first end position wherein the first pilot source is fluidly connected to the first set of electrohydraulic valves and the second set of electrohydraulic valves is fluidly connected to the drain, and a second end position wherein the second pilot source is fluidly connected to the second set of electrohydraulic valves and the first set of electrohydraulic valves is fluidly connected to the drain; and
a controller in communication with the first set of electrohydraulic valves, the second set of electrohydraulic valves, the sensor, and the electrohydraulic selector valve, the controller configured to check the second pilot system by commanding the electrohydraulic selector valve to move to the second end position, commanding the second set of electrohydraulic valves to move the steering valve a predetermined distance preprogrammed into a memory associated with the controller, and monitoring signals from the sensor indicative of the displacement of the steering valve.

17. The machine of claim 16, wherein the first pilot source is connected to the first set of electrohydraulic valves and the second pilot source is connected to the second set of electrohydraulic valves when the electrohydraulic selector valve is transitioning between the first end position and the second end position.

18. The machine of claim 17, wherein the second set of electrohydraulic valves includes a left control valve and a right control valve, and wherein the controller is further configured to send signals to the left control valve and the right control valve to open the left control valve and the right control valve.

19. The machine of claim 18, wherein the controller is further configured to compare the displacement of the steering valve to the predetermined distance preprogrammed into the memory associated with the controller in order to determine a condition of the second pilot system.

20. The machine of claim 19, further comprising an operator interface in communication with the controller, and wherein the controller is further configured to send signals to the operator interface to notify an operator of the condition of the second pilot system.

* * * * *